United States Patent
Meng et al.

(10) Patent No.: US 10,371,985 B2
(45) Date of Patent: Aug. 6, 2019

(54) DISPLAY PANEL, POLARIZER AND DISPLAY DEVICE

(71) Applicant: BOE TECHNOLOGY GROUP CO., LTD., Beijing (CN)

(72) Inventors: Lingjuan Meng, Beijing (CN); Mengjie Wang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 15/516,139

(22) PCT Filed: Sep. 23, 2016

(86) PCT No.: PCT/CN2016/099918
§ 371 (c)(1),
(2) Date: Mar. 31, 2017

(87) PCT Pub. No.: WO2017/128747
PCT Pub. Date: Aug. 3, 2017

(65) Prior Publication Data
US 2017/0329178 A1 Nov. 16, 2017

(30) Foreign Application Priority Data

Jan. 26, 2016 (CN) .................... 2016 2 0075012 U

(51) Int. Cl.
*G02F 1/1335* (2006.01)
*G02B 5/30* (2006.01)
(Continued)

(52) U.S. Cl.
CPC ....... *G02F 1/133528* (2013.01); *G02B 5/201* (2013.01); *G02B 5/3041* (2013.01);
(Continued)

(58) Field of Classification Search
None
See application file for complete search history.

(56) References Cited

U.S. PATENT DOCUMENTS 8,149,182 B2   4/2012   Jin et al.
8,547,489 B2   10/2013  Hsiao et al.
(Continued)

FOREIGN PATENT DOCUMENTS

CN   101097306 A   1/2008
CN   101655622 A   2/2010
(Continued)

OTHER PUBLICATIONS

International Search Report of PCT/CN2016/099918 in Chinese, dated Dec. 27, 2016 with English translation.
(Continued)

*Primary Examiner* — Kenneth B Lee, Jr.
(74) *Attorney, Agent, or Firm* — Collard & Roe, P.C.

(57) ABSTRACT

A display panel, a polarizer and a display device are provided. The display panel includes a panel main body and a first polarizer disposed on at least one main surface of the panel main body. The first polarizer includes a first polarizing layer and a second polarizing layer which are stacked; a first polarizing region is formed on the first polarizing layer; a second polarizing region and a second light-transmitting region are alternately formed on the second polarizing layer; and an absorption axis direction of the second polarizing region is perpendicular to an absorption axis direction of the first polarizing region.

16 Claims, 4 Drawing Sheets

(51) Int. Cl.
    *G02F 1/1337*     (2006.01)
    *G02B 5/20*     (2006.01)
    *G02B 23/26*     (2006.01)
    *G02F 1/1333*     (2006.01)

(52) U.S. Cl.
    CPC ....... *G02B 23/26* (2013.01); *G02F 1/133753* (2013.01); *G02B 5/3033* (2013.01); *G02F 1/133514* (2013.01); *G02F 2001/133342* (2013.01); *G02F 2001/133538* (2013.01)

(56) References Cited

U.S. PATENT DOCUMENTS

| | | | |
|---|---|---|---|
| 8,797,647 B2 | 8/2014 | Wu | |
| 9,395,471 B2* | 7/2016 | Yi | G02B 5/003 |
| 9,514,692 B2 | 12/2016 | Wu | |
| 2013/0114136 A1* | 5/2013 | Saito | G02B 5/3016 |
| | | | 359/465 |
| 2016/0062194 A1* | 3/2016 | Tago | G02F 1/13363 |
| | | | 349/12 |

FOREIGN PATENT DOCUMENTS

| | | |
|---|---|---|
| CN | 102236201 A | 11/2011 |
| CN | 102314020 A | 1/2012 |
| CN | 103003730 A | 3/2013 |
| CN | 103293689 A | 9/2013 |
| CN | 103389582 A | 11/2013 |
| CN | 104280889 A | 1/2015 |
| CN | 104808278 A | 7/2015 |
| CN | 105242342 A | 1/2016 |
| CN | 205334883 U | 6/2016 |

OTHER PUBLICATIONS

Notice of Transmittal of the International Search Report of PCT/CN2016/099918 in Chinese, dated Dec. 27, 2016.

Written Opinion of the International Searching Authority of PCT/CN2016/099918 in Chinese, dated Dec. 27, 2016 with English translation.

* cited by examiner

DISPLAY PANEL, POLARIZER AND DISPLAY DEVICE

CROSS REFERENCE TO RELATED APPLICATIONS

This application is the National Stage of PCT/CN2016/099918 filed on Sep. 23, 2016, which claims priority under 35 U.S.C. § 119 of Chinese Application No. 201620075012.5 filed on Jan. 26, 2016, the disclosure of which is incorporated by reference.

TECHNICAL FIELD

Embodiments of the present disclosure relate to a display panel, a polarizer and a display device.

BACKGROUND

Dual view-field display means that there are two different visual areas on a display device, and these two difference visual areas display different pictures at the same time, for example, a left visual area of the display device displays a left view-field picture, and a right visual area displays a right view-field picture, such that a user views different pictures in different directions of a same display device.

At present, the dual view-field display is realized by providing a prism grating film between a backlight source and a display panel or on an upper surface of the display panel.

However, a thickness of the display device is increased while the prism grating film is provided in the display device.

SUMMARY

In order to solve the problem that the current display device for dual view-field display is thick, a display panel, a polarizer and a display device are provided by embodiments of the disclosure.

According to the embodiments of the disclosure, a display panel is provided. The display panel comprises a panel main body and a first polarizer disposed on at least one main surface of the panel main body. The first polarizer includes a first polarizing layer and a second polarizing layer which are stacked; a first polarizing region is formed on the first polarizing layer; a second polarizing region and a second light-transmitting region are alternately formed on the second polarizing layer; and an absorption axis direction of the second polarizing region is perpendicular to an absorption axis direction of the first polarizing region.

For example, the first polarizer is disposed on one main surface of the panel main body and a second polarizer is disposed on the other main surface of the panel main body.

For example, the first polarizer is disposed on a light emission side of the panel main body and the second polarizer is disposed on a light incident side of the panel main body.

For example, the second polarizing region is a strip-shaped region, a width of the second polarizing region is equal to a pixel width in the panel main body, and a width direction of the second polarizing region is parallel with the absorption axis direction of the second polarizing region.

For example, the second polarizing layer is disposed on a light emission surface of the first polarizing layer.

For example, the first polarizer further includes a first protective layer and a second protective layer, and the first polarizing layer and the second polarizing layer are disposed between the first protective layer and the second protective layer in a stacking manner.

For example, the second polarizing region and the second light-transmitting region have an equal width, and the width direction of the second light transmitting region is parallel with the absorption axis direction of the second polarizing region.

For example, a polarizing dye molecular layer is provided in the first polarizing region and the second polarizing region, and the polarizing dye molecular layer is an iodine molecular layer.

For example, the second polarizer includes a third polarizing layer, and a third protective layer and a fourth protective layer which are disposed on both sides of the third polarizing layer.

According to the embodiments of the disclosure, a polarizer is provided. The polarizer comprises: a first polarizing layer and a second polarizing layer which are stacked. A first polarizing region is formed on the first polarizing layer; a second polarizing region and a second light transmitting region are alternately formed on the second polarizing layer; and an absorption axis direction of the second polarizing region is perpendicular to an absorption axis direction of the first polarizing region.

For example, the second polarizing region is a strip-shaped region, a width of the second polarizing region is equal to a preset width, and a width direction of the second polarizing region is parallel with the absorption axis direction of the second polarizing region.

For example, the polarizer further comprises a first protective layer and a second protective layer, wherein the first polarizing layer and the second polarizing layer are disposed between the first protective layer and the second protective layer in a stacking manner.

For example, the second polarizing region and the second light transmitting region have an equal width, and the width direction of the second light transmitting region is parallel with the absorption axis direction of the second polarizing region.

For example, a polarizing dye molecular layer is distributed in the first polarizing region and the second polarizing region, and the polarizing dye molecular layer is an iodine molecular layer.

For example, the second polarizing layer is disposed on a light emission surface of the first polarizing layer.

According to the embodiments of the disclosure, a display device is provided. The display device comprises the display panel as described above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Figure 1:
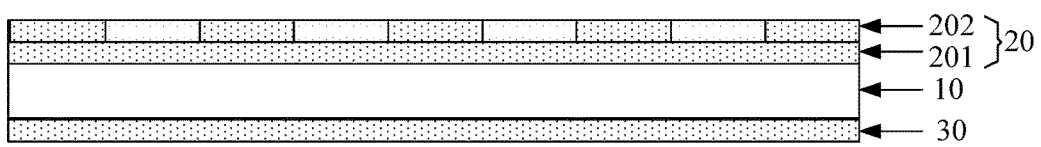
FIG. 1 is a schematic side view of a display panel provided by embodiments of the present disclosure.
Figure 2A:
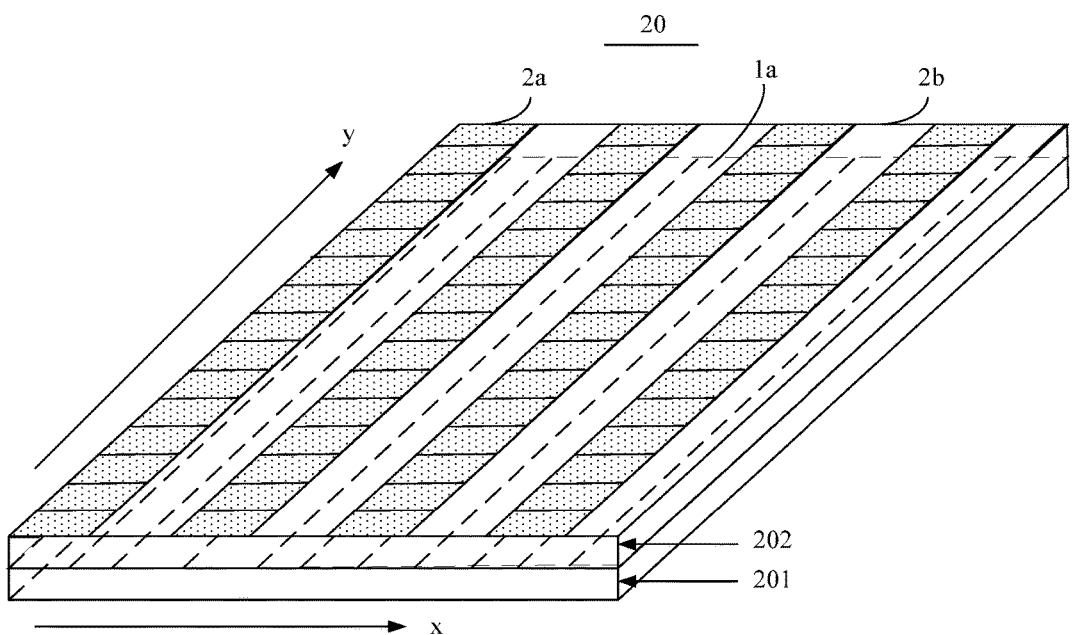
FIG. 2A is a structural schematic view of a first polarizer in the display panel as shown in FIG. 1.

FIG. 1 is a schematic side view of a display panel provided by the embodiments of the present disclosure; as shown in FIG. 1, the display panel comprises a panel main body 10 and a first polarizer 20 located on at least one main surface of the panel main body 10; for example, the panel main body includes two main surfaces, one of the two main surfaces corresponds to a light emission side of the panel main body, the other corresponds to a light incident side of the panel main body; for example, the first polarizer is disposed only on the light emission side of the panel body or the first polarizer is disposed only on the light incident side of the panel body, and a second polarizer 30 is disposed on the side not provided with the first polarizer; for example, the first polarizer is disposed on both the light incident side and the light emission side of the panel main body. Exemplarily, in the display panel as shown in FIG. 1, the first polarizer 20 is located on the light emission side of the panel main body 10; FIG. 2A is a structural schematic view of the first polarizer 20 in the display panel as shown in FIG. 1; referring to FIG. 2A, the first polarizer 20 includes a first polarizing layer 201 and a second polarizing layer 202 which are stacked. For example, the second polarizer includes a third polarizing layer, and a third protective layer and a fourth protective layer which are respectively disposed on both sides of the third polarizing layer.

Figure 2B:
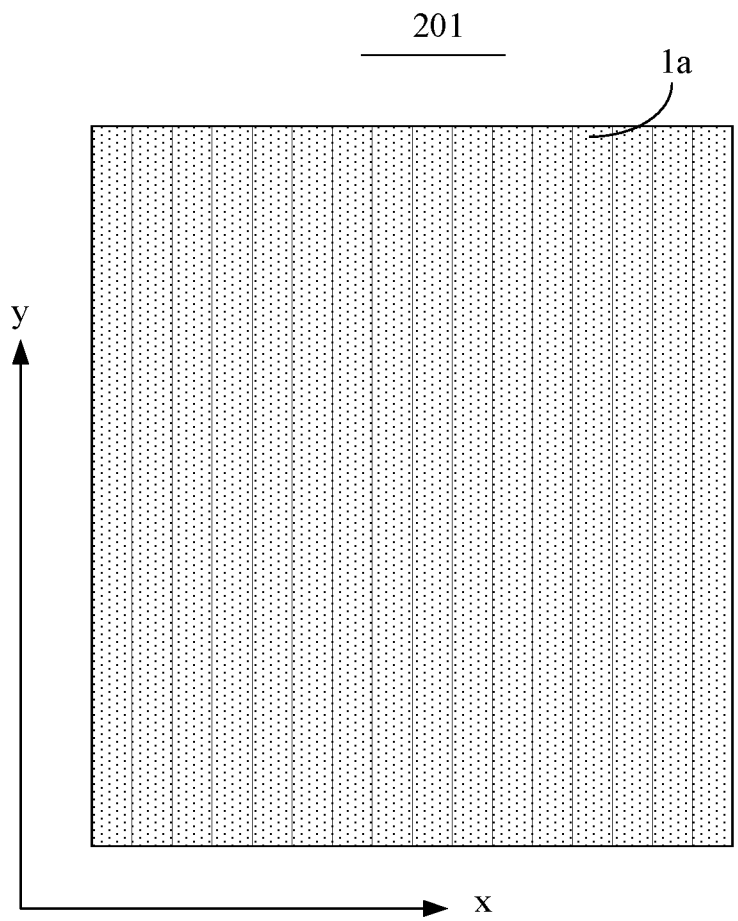
FIG. 2B is a schematic top view of a first polarizing layer of the first polarizer in the display panel as shown in FIG. 1.
Figure 2C:
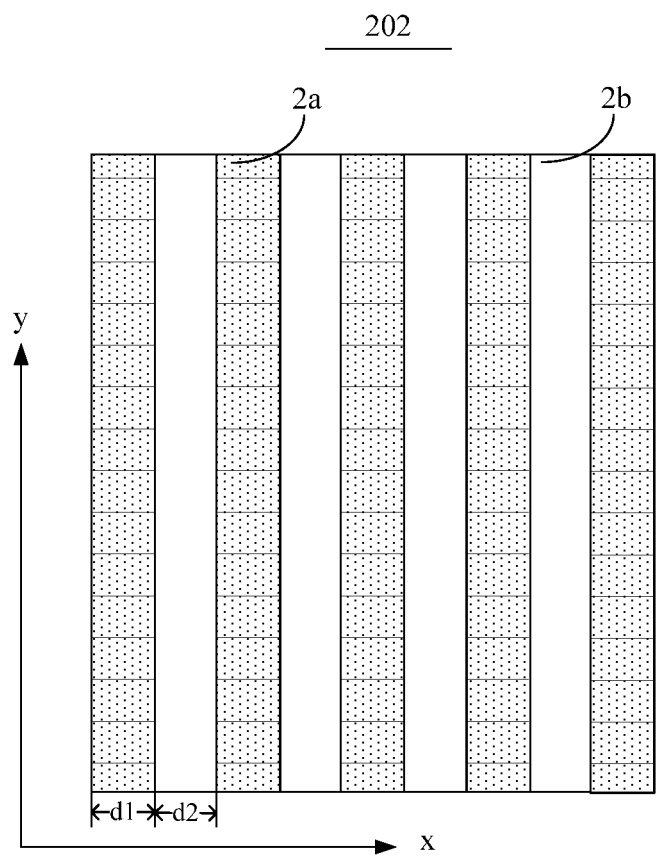
FIG. 2C is a schematic top view of a second polarizing layer of the first polarizer in the display panel as shown in FIG. 1.

FIG. 2B is a schematic top view of the first polarizing layer of the first polarizer in the display panel as shown in FIG. 2B; and referring to FIGS. 2A and 2B, a first polarizing region 1a is formed on the first polarizing layer 201; FIG. 2C is a schematic top view of the second polarizing layer of the first polarizer 20 in the display panel as shown in FIG. 1; referring to FIGS. 2A and 2C, a second polarizing region 2a and a second light-transmitting region 2b are alternately formed on the second polarizing layer 202, and an absorption axis direction x of the second polarizing region 2a is perpendicular to an absorption axis direction y of the first polarizing region 1a in the FIG. 2A.

In FIGS. 2A, 2B and 2C, the x direction is a same direction and the y direction is a same direction.

The display panel provided by the embodiments of the present disclosure comprises the panel main body and the first polarizer located on at least one main surface of the panel main body, the first polarizer includes the first polarizing layer and the second polarizing layer which are stacked; the second polarizing region and the second light-transmitting region are alternately formed on the second polarizing layer, the absorption axis direction of the second polarizing region is perpendicular to the absorption axis direction of the first polarizing region on the first polarizing layer, and therefore, the first polarizer realizes a grating effect through stacking two polarizing layers (that is, the first polarizing layer and the second polarizing layer), and further the dual view-field display of the display device is realized. Thicknesses of the polarizing layers each is at a micrometer scale, then an influence on the thickness of the display device is small, and therefore, the display panel provided by the embodiments of the present disclosure realizes the dual view-field display while an integral thickness of the display device is not increased.

Figure 3A:
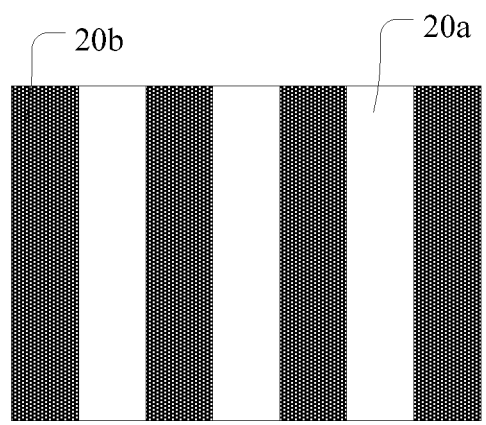
FIG. 3A is a schematic view of an optical effect after the first polarizing layer and the second polarizing layer are stacked provided by the embodiments of the present disclosure.
Figure 3B:
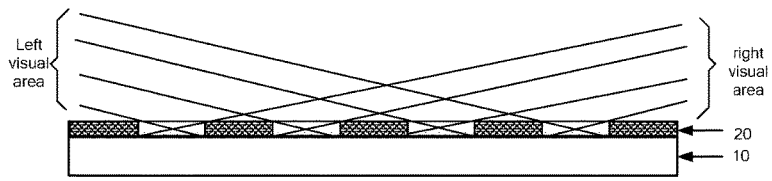
FIG. 3B is a schematic view of a dual view-field display effect realized by the display panel provided by the embodiments of the present disclosure.

In the embodiments of the present disclosure, after light is incident to the first polarizing layer 201, only the light vertical to the absorption axis direction y of the first polarizing region 1a transmits through the first polarizing layer 201; since the absorption axis direction x of the second polarizing region 2a in the second polarizing layer 202 is perpendicular to the absorption axis direction y of the first polarizing region 1a in the first polarizing layer 201, a polarization direction of the light transmitted through the first polarizing layer 201 is parallel with the absorption axis direction x of the second polarizing region 2a; the light transmitted through the first polarizing layer 201 is incident to the second polarized layer 202, the second polarizing region 2a in the second polarizing layer 202 absorbs the incident light, and at this time, the incident light is transmitted through the second light transmitting region 2b in the second polarizing layer 202; therefore, as shown in FIG. 3A, the first polarizer forms a light transmitting region 20a and a non-light transmitting region 20b which are alternately arranged, that is, a grating effect is formed. Hereinafter, the first polarizer 20 disposed on the light emission side of the panel main body 10 is taken as an example for describing a principle that the display panel provided by the embodiments of the present disclosure realizes the dual view-field display effect; referring to FIG. 3B, after the light from the panel main body 10 is incident to the first polarizer 20, part of the light from the panel main body 10 is shielded by the non-light transmitting region of the first polarizer 20, and part of the light from the panel main body 10 is emitted from the light transmitting region of the first polarizer 20, such that two different visual areas, i.e., a left visual area and a right visual area are respectively formed on left and right sides of the display panel, an observer views different pictures from such two visual areas, and therefore, the dual view-field display effect is realized.

It is noted that an orthographic projection of the light transmitting region 20a in FIG. 3A on the second polarizing layer 202 in FIG. 2A coincides with the second polarizing region 2a. For example, a polarizing dye molecular layer is uniformly provided in the first polarizing region 1a and the second polarizing region 2a, and the polarizing dye molecular layer for example is an iodine molecular layer. During the second polarizing layer is manufactured, an organic dye (for example iodine) is adopted to dyeing a polyvinyl alcohol (PVA) film at intervals, then the dyed PVA film is stretched according to a preset direction in an environment having certain temperature and humidity; finally, the second polarizing layer having the light-transmitting region and the non-light transmitting region which are alternately arranged is formed after processes such as dehydrating, baking and the like, wherein an undyed region of the PVA film is the light-transmitting region, a dyed region of the PVA film is the polarizing region, and the preset direction along which the PVA film is stretched is the absorption axis direction of the polarizing region.

For example, as shown in FIG. 1, the first polarizer 20 is disposed on the light emission side of the panel main body 10; in this case, the first polarizer 20 is closer to a color filter substrate (not shown in FIG. 1) in the panel main body 10, and thus, after the light from the panel main body 10 is partially shielded by the first polarizer 20, an included angle between the light emitted from the first polarizer 20 and a normal of the first polarizer 20 is large, and therefore, a viewing angle of the display panel is improved.

For example, as shown in FIG. 2C, the second polarizing region 2a is a strip-shaped region, a width d1 of the second polarizing region 2a is equal to a pixel width in the panel main body, the width d1 of the second polarizing region for example is equal to a width d2 of the second light transmitting region, the pixel width is a width of each pixel unit in the panel main body, and the width direction of the second polarizing region 2a and the width direction of the second light transmitting region 2b are both parallel with the absorption axis direction x of the second polarizing region 2a.

Further, as shown in FIG. 1, the second polarizing layer 202 is disposed on a light emission surface of the first polarizing layer 201.

Figure 4:
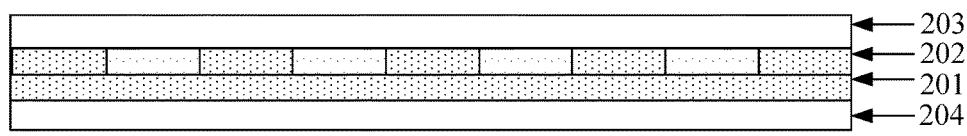
FIG. 4 is a schematic side view of the first polarizer provided by the embodiments of the present disclosure.

FIG. 4 is a schematic side view of the first polarizer provided by the embodiments of the present discourse; as shown in FIG. 4, the first polarizer 20 for example further includes: a first protective layer 203 and a second protective layer 204.

For example, the first polarizing layer 201 and the second polarizing layer 202 are disposed between the first protective layer 203 and the second protective layer 204 in a stacking manner, the first protective layer 203 and the second protective layer 204 for example are tri-cellulose acetate (TAC) films which have high transmittance, better water resistance and certain mechanical strength and play a role of protecting the polarizing layers.

Figure 5:
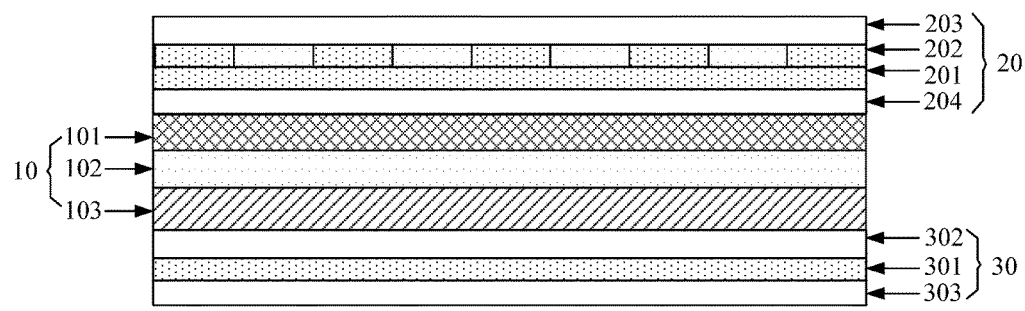
FIG. 5 is a schematic side view of another display panel provided by the embodiments of the present disclosure.

FIG. 5 is a schematic side view of another display panel provided by the embodiments of the present disclosure; as shown in FIG. 5, the panel main body 10 in the display panel includes a color filter substrate 101, an array substrate 103 and a liquid crystal layer 102 disposed between the color filter substrate 101 and the array substrate 103, a light incident side of the panel main body 10 is provided with a second polarizer 30, the light emission side of the panel main body 10 is provided with a first polarizer 20, the second polarizer 30 for example include a third polarizing layer 301, and a third protective layer 302 and a fourth protective layer 303 which are disposed on both sides of the third polarizing layer 301.

The display panel provided by the embodiments of the present disclosure comprises the panel main body and the first polarizer located on at least one main surface of the panel main body, the first polarizer includes the first polarizing layer and the second polarizing layer which are stacked; the second polarizing region and the second light-transmitting region are alternately formed on the second polarizing layer, the absorption axis direction of the second polarizing region is perpendicular to the absorption axis direction of the first polarizing region on the first polarizing layer, and therefore, the first polarizer realizes the grating effect through the two polarizing layers which are stacked, and further the dual view-field display of the display device is realized. Thicknesses of the polarizing layers each is at a micrometer scale, then an influence on the thickness of the display device is small, and therefore, the display panel provided by the embodiments of the present disclosure realizes the dual view-field display of the display device while an integral thickness of the display device is not increased.

The embodiments of the present disclosure further provide a polarizer, referring to FIG. 2A, the polarizer includes: a first polarizing layer 201 and a second polarizing layer 202 which are stacked; a first polarizing region 1a is formed on the first polarizing layer 201; a second polarizing region 2a and a second light-transmitting region 2b are alternately formed on the second polarizing layer 202, and an absorption axis direction x of the second polarizing region 2a is perpendicular to an absorption axis direction y of the first polarizing region 1a.

For example, as shown in FIG. 2C, the second polarizing region 2a is a strip-shaped region, a width d1 of the second polarizing region 2a is equal to a preset width (for example, a pixel width in a panel main body in the case that the polarizer is applied to the display panel), the width d1 of the second polarizing region for example is equal to a width d2 of the second light transmitting region, the width direction of the second polarizing region and the width direction of the second light-transmitting region are both parallel with the absorption axis direction x of the second polarizing region. Further, as shown in FIG. 1, the second polarizing layer 202 for example is disposed on a light emission surface of the first polarizing layer 201.

For example, as shown in FIG. 4, the first polarizer 20 further includes: a first protective layer 203 and a second protective layer 204; the first polarizing layer 201 and the second polarizing layer 202 are disposed between the first protective layer 203 and the second protective layer 204 in a stacking manner, the first protective layer and the second protective layer for example are TAC films.

For example, a polarizing dye molecular layer is uniformly provided in the first polarizing region 1a and the second polarizing region 2a, and the polarizing dye molecular layer for example is an iodine molecular layer.

The polarizer provided by the embodiments of the present disclosure includes the first polarizing layer and the second polarizing layer which are stacked; the second polarizing region and the second light transmitting region are alternately formed on the second polarizing layer, the absorption axis direction of the second polarizing region is perpendicular to the absorption axis direction of the first polarizing region on the first polarizing layer, and therefore, the first polarizer realizes a grating effect through the two polarizing layers which are stacked. Since a thickness of the polarizer is small, the display panel using the polarizer realizes the dual view-field display effect while an integral thickness of the device is not increased.

Figure 6:
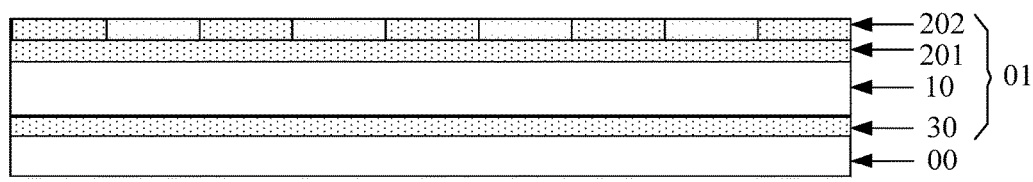
FIG. 6 is a schematic side view of a display device provided by the embodiments of the present disclosure.

FIG. 6 is a schematic side view of a display device provided by the embodiments of the present disclosure; as shown in FIG. 6, the display device for example includes: a backlight source 00 and a display panel 01, and the display panel 01 for example is a display panel as shown in FIG. 1 or FIG. 5.

The embodiments of the present disclosure for example bring about beneficial effects as follows:

The embodiments of the present disclosure provide the display panel, the polarizer and the display device; the display panel comprises the panel main body and the first polarizer located on at least one main surface of the panel main body, the first polarizer includes the first polarizing layer and the second polarizing layer which are stacked; the first polarizing region is formed on the first polarizing layer; the second polarizing region and the second light transmitting region are alternately formed on the second polarizing layer, the absorption axis direction of the second polarizing region is perpendicular to the absorption axis direction of the first polarizing region, and therefore, the first polarizer realizes the grating effect through the two polarizing layers which are stacked, and further the dual view-field display of the display device is realized. Since a thickness of the polarizing layer is at a micrometer scale, an influence on the thickness of the display device is small, and therefore, the display panel provided by the embodiments of the present disclosure realizes the dual view-field display of the display device while an integral thickness of the display device is not increased.

It is evident that a person skilled in the art can make various changes or modifications to the present disclosure without departing from the spirit and scope of the present disclosure. Thus, if such changes and modifications to the present disclosure are within the scope of the claims of the present disclosure and equivalent thereof, the present disclosure also intends to include all such changes and modifications within its scope.

The foregoing embodiments merely are exemplary embodiments of the disclosure, and not intended to define the scope of the disclosure, and the scope of the disclosure is determined by the appended claims.

The application claims priority of Chinese Patent Application No. 201620075012.5 filed on Jan. 26, 2016, the disclosure of which is incorporated herein by reference in its entirety as part of the present application.

The invention claimed is:

1. A display panel, comprising a panel main body and a first polarizer disposed on at least one main surface of the panel main body, wherein
    the first polarizer includes a first polarizing layer and a second polarizing layer which are stacked;
    a first polarizing region is formed on the first polarizing layer;
    a second polarizing region and a second light-transmitting region are alternately formed on the second polarizing layer; and
    an absorption axis direction of the second polarizing region is perpendicular to an absorption axis direction of the first polarizing region.

2. The display panel according to claim 1, wherein the first polarizer is disposed on one main surface of the panel main body and a second polarizer is disposed on the other main surface of the panel main body.

3. The display panel according to claim 2, wherein the first polarizer is disposed on a light emission side of the panel main body and the second polarizer is disposed on a light incident side of the panel main body.

4. The display panel according to claim 1, wherein the second polarizing region is a strip-shaped region, a width of the second polarizing region is equal to a pixel width in the panel main body, and a width direction of the second polarizing region is parallel with the absorption axis direction of the second polarizing region.

5. The display panel according to claim 1, wherein the second polarizing layer is disposed on a light emission surface of the first polarizing layer.

6. The display panel according to claim 1, wherein the first polarizer further includes a first protective layer and a second protective layer, and the first polarizing layer and the second polarizing layer are disposed between the first protective layer and the second protective layer in a stacking manner.

7. The display panel according to claim 1, wherein the second polarizing region and the second light-transmitting region have an equal width, and the width direction of the second light transmitting region is parallel with the absorption axis direction of the second polarizing region.

8. The display panel according to claim 1, wherein a polarizing dye molecular layer is provided in the first polarizing region and the second polarizing region, and the polarizing dye molecular layer is an iodine molecular layer.

9. The display panel according to claim 2, wherein the second polarizer includes a third polarizing layer, and a third protective layer and a fourth protective layer which are disposed on both sides of the third polarizing layer.

10. A polarizer, comprising: a first polarizing layer and a second polarizing layer which are stacked, wherein
    a first polarizing region is formed on the first polarizing layer;
    a second polarizing region and a second light transmitting region are alternately formed on the second polarizing layer; and
    an absorption axis direction of the second polarizing region is perpendicular to an absorption axis direction of the first polarizing region.

11. The polarizer according to claim 10, wherein
    the second polarizing region is a strip-shaped region, a width of the second polarizing region is equal to a preset width, and a width direction of the second polarizing region is parallel with the absorption axis direction of the second polarizing region.

12. The polarizer according to claim 10, further comprising a first protective layer and a second protective layer, wherein the first polarizing layer and the second polarizing layer are disposed between the first protective layer and the second protective layer in a stacking manner.

13. The polarizer according to claim 10, wherein the second polarizing region and the second light transmitting region have an equal width, and the width direction of the second light transmitting region is parallel with the absorption axis direction of the second polarizing region.

14. The polarizer according to claim 10, wherein a polarizing dye molecular layer is distributed in the first polarizing region and the second polarizing region, and the polarizing dye molecular layer is an iodine molecular layer.

15. The polarizer according to claim 10, wherein
    the second polarizing layer is disposed on a light emission surface of the first polarizing layer.

16. A display device, comprising the display panel according to claim 1.

* * * * *